March 3, 1959  J. L. HEMERY ET AL  2,876,109
METHOD OF TREATING MEAT PRODUCTS
Filed Feb. 13, 1956
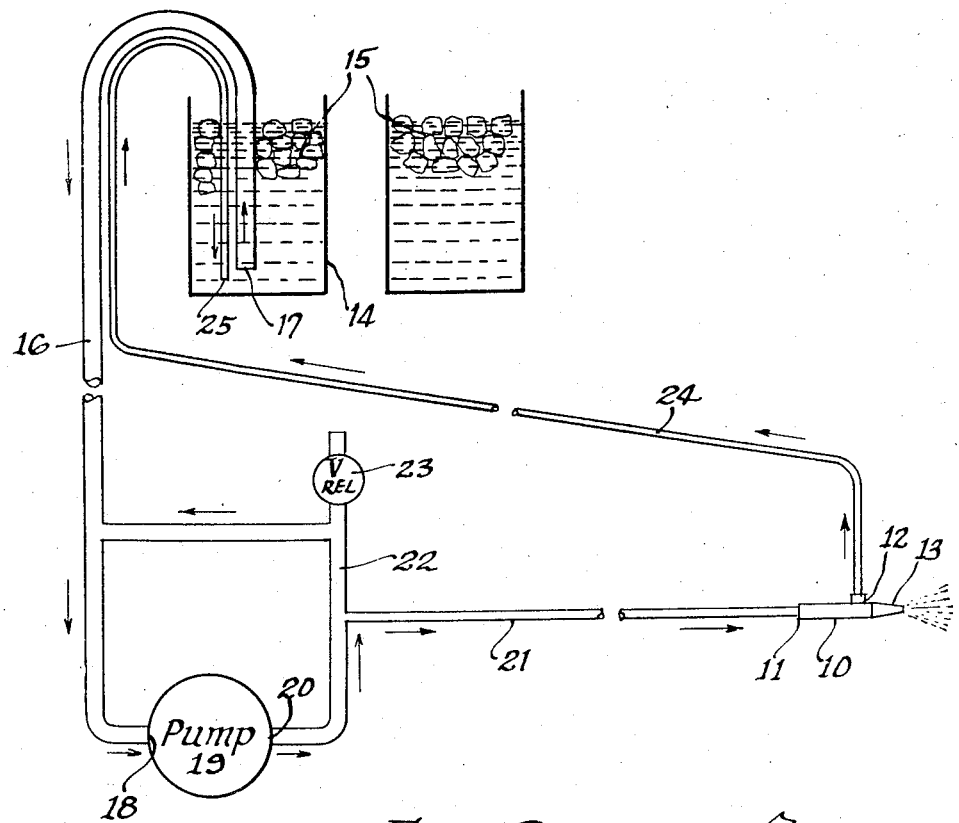
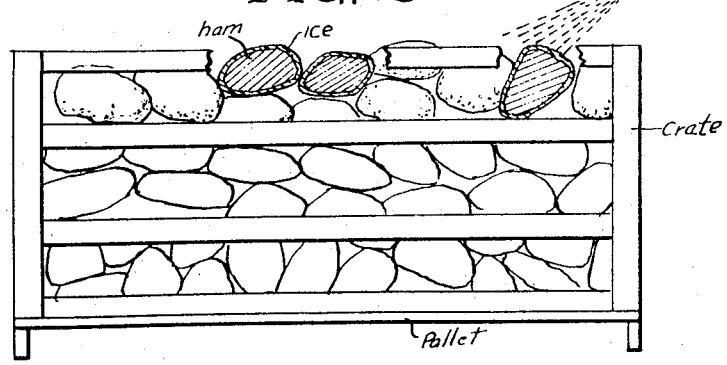
INVENTORS
Jack L. Hemery
BY Joseph G. Farrell
Attorneys

United States Patent Office 2,876,109
Patented Mar. 3, 1959

2,876,109

METHOD OF TREATING MEAT PRODUCTS

Jack L. Hemery, Des Plaines, and Joseph G. Farrell, Chicago, Ill., assignors to Continental Freezers of Illinois, Inc., Chicago, Ill., a corporation of Illinois Application February 13, 1956, Serial No. 565,009

1 Claim. (Cl. 99—169)

This invention relates to the storage of frozen food products and it relates more particularly to the storage of hams and the like pork products under freezing conditions without deterioration of the quality and character of the meat and it relates further to means and apparatus for processing the meat in preparation for storage.

The storage of foods under frozen conditions permits such food products to be retained over extended periods of time without deterioration and without material loss in the character and quality or taste of the food. Storage under such conditions on a small scale has been made available by the use of home freezer units. Storage of frozen foods on a commercial scale has been in use for some time for the purpose of minimizing the fluctuation in price and supply of certain food products by the technique of storing excesses when the supply is large and by the release of such stored products when the supply diminishes. The utilization of this technique for the marketing of perishable foods such as meats, and especially hams, is, however, complicated by difficulties in maintaining the original texture and taste in the meat that is being stored and it is an object of this invention to provide a process for use in the storage of hams and the like food products under freezing conditions without change in texture, taste and quality of the food product, and it is a related object to provide a means and apparatus for accomplishing same.

Some of the difficulties which arise in the storage of foods under frozen conditions can best be illustrated in the storage of hams under commercial conditions and the invention therefore will be described with reference to the processing of hams. However, it will be understood that the concepts described and claimed herein can be applied similarly to the treatment and storage of other frozen food products.

When a ham is stored under freezing conditions, preferably at a temperature of about 0 to about —20° F., moisture is extracted from the surface portion of the ham as by means of sublimation or evaporation with the result that freezer burns are caused to form in the exposed surfaces. The portions which have been freezer burned tend to change in color and they become tough and tasteless with the result that such portions are generally trimmed from the meat product before marketing with the result that considerable loss is experienced in the labor required for trimming and in the amount of meat that is discarded as waste.

Various means have been proposed for the treatment of hams to protect the hams against freezer burns. One of the processes adopted for commercial practice resides in the treatment of the hams to form a film of ice about the surfaces thereof so that evaporation of moisture during storage takes place from the film of ice present as a protective coating about the exposed surfaces of the meat as distinguished from the meat itself with the result that the concentration of moisture is retained in the exposed surfaces of the meat at least as long as the ice layer remains on the surfaces to protect the underlying portions. The use of an ice layer in intimate contact with the meat and as a protective covering over the surfaces thereof has been found effective to minimize freezer burns.

Various systems have been developed for use in the treatment of hams to provide a film of ice as a continuous layer over the surfaces of the hams but, to the present, such processes have required the utilization of considerable amounts of labor and time as well as considerable amounts of space and equipment and the amount of ice provided on the surfaces of the hams has been found insufficient to protect the meat for more than a fraction of the time in storage. As a result, the processes which have heretofore been employed have been found deficient in many respects.

In one such method which has been developed, use is made of a dip tank filled with water that has been refrigerated to slightly above freezing temperature. The dip tank of large dimension is usually located outside of the freezing room in order to prevent freezing the water in the bath and in order to enable handling the equipment in processing the hams therethrough. Prior to processing the hams through the dip tank, the hams are frozen to a temperature of about 0 to —10° F. The cold hams are removed to the dip room for processing and then are immersed separately in sequence in the bath of water of the dip tank by inserting the hams from one end and withdrawing the hams from another after which the wet hams are placed upon a table. The excess water drains from the hams, leaving a thin film which during the passage of time extracts sufficient cold from the interior portions of the hams to cause freezing of the film of moisture to form a thin ice layer on the surfaces of the hams. The film of ice that is formed by immersion is insufficient to offer much protection over an extended period of time. In the attempt to build up a thicker film of ice for greater protection, the hams are dipped one or more additional times but, for various reasons, little, if any, additional build-up occurs in the ice layer by subsequent dipping processes.

Since the transfer of cold from the hams to the water occurs at an accelerated rate when the hams are immersed in the water and since the cold for freezing the water remaining on the surfaces of the hams must be extracted from the surface portions of the hams themselves, it becomes necessary to provide sufficient time for the cold to transfer from the interior of the hams to the surface for use in freezing additional layers of ice on the hams. In the interim, the hams which are exposed to room temperature tend to warm up slowly to the extent that a point of diminishing return is soon reached wherein the thickness of the layer of ice on the surfaces of the hams is no longer capable of appreciable increase from subsequent dipping processes. In fact, a point is reached soon after the second or third dip wherein the thickness of the layer of ice formed on the hams is no longer increased and, in some instances, it is diminished by reason that the ice previously formed on the hams begins to melt either in the water or upon standing in the room at a temperature above freezing. Ordinarily this condition develops before a layer of ice having a thickness of 1/64 inch is formed on the surfaces of the hams. An ice film of such thickness is insufficient for use to protect the hams for a period of more than two to three months. Thus it becomes necessary to break down the pile of hams for retreatment or else to soak the hams with water in the pile with the result that the hams become bonded one to another in the pile and the force required for subsequent separation for shipment often results in damage to the hams and difficulties in handling.

It is an object of this invention to provide a method for treatment of hams and the like food products for storage under freezing conditions wherein the hams can be treated in large volumes with a minimum expenditure of labor and with a minimum requirement of space; wherein a film of ice can be provided on the exposed surfaces in amounts to offer protection for the full time that the hams or food products are to remain in the freezer thereby to enable storage without the need for reprocessing; which permits the treatment to be carried out within the freezing room thereby to make most efficient use of the cold within the room in the formation of ice on the surface of a ham or other food product and thereby also to minimize the amount of heat added to the food product during the application of the protective coating; wherein the ham or other food product can be processed without handling the individual product and wherein the meat can be processed on the pallets used for storage and for transportation to unload the hams for shipment thereby to protect the hams and other food products against contamination from handling and from damage due to packaging for storage or separation for shipment, thus materially to reduce the cost in labor and equipment and markedly to increase the protection of the hams and other food products against freezer burns, deterioration or change, and thereby also to minimize the damage to the meat in handling for storage or shipment.

These and other objects and advantages of this invention will hereinafter appear and for purposes of illustration, but not of limitation, an embodiment of the invention is shown in the accompanying drawing in which—

Figure 1 is a schematic view of the equipment used in the practice of this invention, and Figure 2 is an elevational view illustrating the practice of the invention in the storage of hams.

In accordance with the practice of this invention, the hams are loaded in their fresh packing condition directly into pallets used for storage and transportation. One pallet formed of a raised bottom platform and open sides which are separable from the platform can hold as many as 50–100 hams. The pallet of hams is placed in the room maintained at a temperature within the range of below freezing down to as low as —35° F. but preferably at a temperature within the range of —10° F. to —20° F. After exposure for a time sufficient to bring the hams down to a temperature within the range of freezing to —25° F. and preferably to a temperature between 0 to —10° F., usually about 48–120 hours, the hams on the pallets are sprayed with water issuing as a continuous stream under pressure from a nozzle which is manipulated over and about the hams and into the spaces between the hams on the pallet to coat the hams over the exposed surfaces with a layer of water. By reason of the treatment of the hams in a room considerably below freezing temperature and because the temperature of the water sprayed onto the surfaces of the hams is slightly above freezing, the water applied to the surfaces of the hams tends to freeze substantially immediately whereby a relatively heavy deposit remains to form a fairly thick layer of ice on the surface with very little, if any, drainage. Since application is made in an atmosphere wherein the temperature is substantially below freezing, the water applied to the surfaces of the hams is capable of extracting cold both from the surface portion of the hams and from the room with the result that freezing occurs almost instantaneously and the ice is reduced in temperature sufficiently quickly to enable additional layers of cold water to be applied onto the exposed surfaces to cause additional ice formation independently of the insulating layer of ice previously formed on the hams. It will also be understood that the ability of the water to extract cold from the room in substantial amounts to cause freezing minimizes the amount of cold which is extracted from the surface portion of the meat and the maintenance of the ice coated hams in the room at freezing temperature enables the surface portion of the meat to be reduced again quickly to normal freezing temperature thereby to provide for uniformity in the temperature of the surface portion of the meat and the ability to form additional layers of ice without being subject to the diminishing returns experienced with prior dip processes.

Thus it is possible, without stopping, to water from two to ten pallets of hams one after the other and then repeat for as many times as necessary to build up additional layers of ice on the hams whereby one person can process from six to eight pallets of hams in the space of an hour to provide a composite layer of ice on the exposed surfaces of the hams having thicknesses greater than ⅛ inch and up to as much as ¼ to ½ inch in thickness, if desired. The ice formed on the surfaces of the hams by the process described provides for a high glossy finish which can be used as an indicator for the presence of a protective layer of ice of sufficient thickness.

The treated pallets can then be piled as units one on top of the other for storage in the storage room without the necessity to break down the pile for retreatment after a short period of time. After storage, as for six months, a layer of ice of substantial thickness remains on the exposed surfaces of the hams in the stacked pallets. The layers of ice formed in situ with the packed hams will function as a seal bonding one ham with the others adjacent to it in the pallet but with a bond that permits separation when the pallet of hams is dumped into the refrigerated truck for delivery. The amount of ice remaining on the surfaces of the hams is sufficient usually further to protect the hams upon transportation in the refrigerated truck, car or other conveyance and removal is often complete upon delivery thereby to offer complete protection from the start to the finish of the storage cycle with the use of very little labor by comparison with other processes heretofore employed.

By comparison with the dip process, one man in about one hour can treat as many hams as heretofore required the use of three to four men over the same period. At the same time, a layer of ice can be provided on the exposed surfaces of the hams which is from 2–30 times greater than the thickness of the layer of ice capable of being provided by the dip process.

One of the limitations in a process of the type described resides in the development of a system wherein water at about freezing temperature can be processed for application onto the hams while being housed within a room maintained at a temperature considerably below freezing. A suitable arrangement for the equipment is represented diagrammatically in the drawing wherein use is made of a nozzle 10 having an inlet 11 through which the cold water is introduced into the nozzle, an outlet 12 through which excess water is allowed to pass from the nozzle, and a spray head 13 selected to be of a size for the issuance of a stream of water for application over the surfaces of the frozen hams or other food products in amounts capable of being reduced to a frozen state prior to flow or drainage of the water from the surfaces of the hams in substantial amounts.

To prevent freezing of the water in the nozzle 10, it is desirable to provide for continuous flow through the nozzle and concurrently to provide for constant circulation of the cold water through the lines leading to and from the nozzle. These conditions are accomplished by the use of a housing in the form of a tank 14 filled with water 15 and having means therein for refrigerating the water to a temperature slightly above freezing. For this purpose use can be made of cakes of ice or else use can be made of conventional refrigerating means such as the evaporation coils of a refrigerating machine.

Extending downwardly into the tank is a suction line 16 in the form of a rubber hose or the like having its inlet 17 adjacent the bottom side of the tank. The suction line is secured at its other end to the inlet 18 of a circulating pump 19 adapted to be power operated, as by means of an electric motor or else by power transmission means in the form of a gear drive, belt, chain or the like. The outlet 20 from the pump is joined by the discharge line 21 to the inlet 11 of the nozzle 10. To prevent damage to the pump in the event that freezing occurs in the discharge line 21 or nozzle 10, the passage joining the outlet 20 of the pump with the dsicharge line is connected to the suction line 16 by means of a by-pass line 22 having a pressure relief valve 23 in control thereof to permit the water to be circulated from the outlet to the inlet through the by-pass upon operation of the valve as at a pressure of about 100 pounds per square inch or such other pressure slightly above the pressure for which the nozzle is set.

As previously pointed out, freezing in the discharge line 21 and the nozzle 10 is minimized by continuous circulation of an amount of cold water through the lines in excess of that capable of passing through the spray head 13. The excess is adapted to be returned to the tank 14 by the return line 24 having one end in communication with the outlet 12 of the nozzle while the other end 25 extends downwardly into the tank 14.

It is preferred to make use of two or more tanks for housing the refrigerated water to insure continuous operation as by removal of the return line 24 and suction line 16 from one tank for placement into the other when the first is about to become empty.

It will be apparent from the foregoing that we have provided a simple and efficient means for processing hams, pork and other food products to provide a protective coating of ice about the exposed portions thereof to prevent the elimination of moisture from the surfaces of the food products while being maintained at freezing conditions thereby to eliminate the development of freezer burns. It will be apparent further that we have provided means whereby the application of a protective coating of ice can be achieved without the utilization of large amounts of skilled labor and without the requirement of a considerable amount of space or equipment and that means are provided to enable processing of the meat under conditions which minimize the amount of handling for storage and for shipment thereby materially to improve the process for the storage of perishable food products.

It will be understood that changes may be made in the details of handling and application of the materials and equipment without departing from the spirit of the invention, especially as defined in the following claim.

I claim:

The method of treating meat products to prevent freezer burns caused by loss of moisture from the surfaces thereof during storage in a frozen state comprising the steps of extracting heat from the meat products to reduce the temperature thereof to within the range of 0 to —25° F., flow-coating the frozen meat products with water at a temperature slightly above freezing temperature and in an amount capable of being reduced to a frozen state upon contact with the frozen surfaces of the meat products before drainage of substantial amounts thereof from the surfaces of the meat products and while the meat products are maintained in a room having a temperature within the range of 0 to —35° F. whereby the applied water is converted to ice by extraction of cold from the surface portions of the meat products in contact with the water and from the room thereby to maintain the temperature of the meat products at or below freezing temperature, and intermittently repeating the step of the application of the water onto the meat products until a relatively clear composite layer of ice is formed thereon having a thickness greater than 1/8 inch and up to 1/2 inch.

References Cited in the file of this patent

UNITED STATES PATENTS

| | | |
|---|---|---|
| 709,751 | Davis | Sept. 23, 1902 |
| 1,931,623 | Robertson | Oct. 24, 1933 |
| 2,145,393 | Hergert | Jan. 31, 1939 |
| 2,175,680 | Bedford | Oct. 10, 1939 |
| 2,183,732 | Zarotschenzeff | Dec. 19, 1939 |
| 2,194,684 | Bedford | Mar. 26, 1940 |
| 2,337,645 | Cadwell | Dec. 28, 1943 |
| 2,461,375 | Eftihios | Feb. 18, 1949 |
| 2,708,635 | Draper | May 17, 1955 |